(12) United States Patent
Tsukada et al.

(10) Patent No.: US 9,413,020 B2
(45) Date of Patent: Aug. 9, 2016

(54) METHOD OF SHUT-DOWN AND STARTING OF A FUEL CELL

(75) Inventors: Akinori Tsukada, Kirchdorf (CH); Philipp Dietrich, Unterendingen (CH); Marcel Hofer, Villmergen (CH); Felix Buechi, Langenthal (CH); Uwe Hannesen, Schüpfen (CH)

(73) Assignee: Belenos Clean Power Holding AG, Bienne (CH)

( * ) Notice: Subject to any disclaimer, the term of this patent is extended or adjusted under 35 U.S.C. 154(b) by 135 days.

(21) Appl. No.: 13/119,546

(22) PCT Filed: Apr. 27, 2009

(86) PCT No.: PCT/EP2009/055079
§ 371 (c)(1),
(2), (4) Date: Jun. 23, 2011

(87) PCT Pub. No.: WO2010/031601
PCT Pub. Date: Mar. 25, 2010

(65) Prior Publication Data
US 2011/0250516 A1  Oct. 13, 2011

(30) Foreign Application Priority Data
Sep. 17, 2008  (EP) .................................... 08164501

(51) Int. Cl.
*H01M 8/04*  (2016.01)

(52) U.S. Cl.
CPC ...... *H01M 8/04223* (2013.01); *H01M 8/04388* (2013.01); *H01M 8/04395* (2013.01);
(Continued)

(58) Field of Classification Search
USPC ....................................................... 429/13, 17
See application file for complete search history.

(56) References Cited

U.S. PATENT DOCUMENTS 6,635,370 B2 * 10/2003 Condit et al. ................. 429/415
2001/0055707 A1   12/2001 Roberts et al.
(Continued)

FOREIGN PATENT DOCUMENTS

DE      100 59 393       6/2002
GB  WO 2007/125368   * 11/2007 ............... H01M 8/08
(Continued)

OTHER PUBLICATIONS

International Search Report issued Mar. 4, 2010 in PCT/EP09/055079 filed Apr. 27, 2009.

*Primary Examiner* — Ula C Ruddock
*Assistant Examiner* — Osei Amponsah
(74) *Attorney, Agent, or Firm* — Oblon, McClelland, Maier & Neustadt, L.L.P.

(57) ABSTRACT

A method of operating a PEM fuel cell including an anode feed circuit and a cathode feed circuit for feeding of an anode side with a reactant gas and for feeding a cathode side with a cathode gas. A shut-down mode for shutting down an electricity generating operation of the fuel system includes decreasing the supply of reactant gas and cathode gas in response of a shut-down signal, monitoring an output voltage of at least one cell of a fuel cell stack, monitoring the reactant gas pressure and the cathode gas pressure, electrically shunting of the at least one fuel cell in response of the output voltage reaching a predefined voltage level, at least reducing the pressure of the anode side to a predefined pressure level by means of at least one pump, and filling and/or flushing of at least the anode side with an inert gas.

24 Claims, 7 Drawing Sheets

(52) U.S. Cl.
CPC ...... *H01M8/04552* (2013.01); *H01M 8/04753* (2013.01); *H01M 8/04097* (2013.01); *H01M 8/04231* (2013.01); *H01M 8/04238* (2013.01); *Y02E 60/50* (2013.01)

(56) References Cited

U.S. PATENT DOCUMENTS

2002/0009623  A1   1/2002   St-Pierre et al.

2005/0142399  A1*  6/2005   Kulp et al. .............. 429/13
2008/0038595  A1   2/2008   Buchi et al.

FOREIGN PATENT DOCUMENTS

| JP | 06-333586 | * 12/1994 | ............ H01M 8/04 |
| JP | 2006 333586 | 12/2006 | |
| WO | 2006 040999 | 4/2006 | |
| WO | 2007 090284 | 8/2007 | |
| WO | 2007 125368 | 11/2007 | |

* cited by examiner

METHOD OF SHUT-DOWN AND STARTING OF A FUEL CELL

BACKGROUND

The present invention relates to methods of operating, in particular for shutting down and starting of a fuel cell system in such a way, that degradation of performance over time is minimized. The invention further concerns a corresponding fuel cell system.

Electrochemical fuel cells of the above-mentioned type convert reactants, typically a stream of hydrogen and a stream of oxygen, into electric power and water. Proton exchange membrane fuel cells (PEMFC) generally comprise a solid polymer electrolyte membrane disposed between two porous electrically conductive electrode layers so as to form a membrane electrode assembly (MEA). In order to induce the desired electrochemical reaction, the anode electrode and the cathode electrode each comprise one or more catalyst. These catalysts are typically disposed at the membrane/electrode layer interface.

At the anode, the hydrogen moves through the porous electrode layer and is oxidized by the catalyst to produce protons and electrons. The protons migrate through the solid polymer electrolyte towards the cathode. The oxygen, for its part, moves through the porous cathode and reacts with the protons coming through the membrane at the cathode. The electrons travel from the anode to the cathode through an external circuit, producing an electrical current.

Typical proton exchange membrane fuel cell stacks include a pair of end plate assemblies and a plurality of fuel cell assemblies. Reactant and coolant fluid streams are supplied to, and exhausted from, internal manifolds and passages in the stack via inlet and outlet ports in the end plates.

Each fuel cell assembly includes an anode flow field plate, a cathode flow field plate and a Membrane Electrode Assembly (MEA) interposed between these flow field plates. Anode and cathode flow field plates are made out of an electrically conductive material and act as current collectors. As the anode flow field plate of one cell sits back to back with the cathode flow field plate of the neighboring cell, electric current can flow from one cell to the other and thus through the entire stack. Other prior art fuel cell stacks are known in which individual cells are separated by means of cooling elements between flow field plates or by means of a single bipolar flow field plate instead of by separate anode and cathode flow field plates.

Flow field plates further provide a fluid barrier between adjacent fuel cell assemblies so as to keep reactant fluid supplied to the anode of one cell from contaminating reactant fluid supplied to the cathode of another cell. At the interface between MEA and plates, fluid flow fields direct the reactant fluids to the electrodes. A fluid flow field typically comprises a plurality of fluid flow channels formed in the major surfaces of flow field plates facing the MEA. One purpose of a fluid flow field is to distribute the reactant fluid to the entire surface of the respective electrodes, namely the hydrogen on the anode side and the oxygen on the cathode side.

One known problem with PEMFCs is the progressive degradation of performance over time. Actually, long-term operation of solid polymer fuel cells has been proven, but only under relatively ideal conditions. In contrast, when the fuel cell has to operate in a wide range of conditions, as it is the case for automotive applications in particular, the ever-changing conditions (often modeled as load cycling and start-stop cycles), have been shown to reduce durability and lifespan drastically.

Different types of non-ideal conditions have been identified in the literature. A first of these conditions is referred to as "high cell voltage"; it is known that exposing a fuel cell to low or zero current conditions, leads to higher degradation rates in comparison to operation at an average constant current. A second non-ideal condition is "low cell voltage"; it is further known that drawing a peak current from the fuel cell also leads to increased degradation rates. It follows from the above that, in order to preserve the lifespan of a fuel cell, it is preferable to avoid both "high cell voltage" and "low cell voltage" operating conditions. In other words, the fuel cell should be operated only in a limited voltage range.

In order to cope with the abrupt changes in load that are typical for automotive applications, an electrochemical energy storage unit, such as a battery or a super capacitor, is usually associated with the fuel cell. The battery can work as a buffer: supplying electric power when there is a peak in the load and, conversely, storing excess electric power in case of low or zero load conditions. In principle, such an arrangement allows operating the fuel cell in the desired limited voltage range. However, once the battery is completely charged, it obviously ceases to be available for storing the excess electric power supplied by the fuel cell. A known solution to this last problem is simply to shut down the fuel cell until the level of charge of the battery reaches a lower threshold. However, start-stop cycles also contribute to the degradation of performance over time.

Document U.S. 2008/0038595 A1 for instance discloses a method for shutting down an electricity supply system comprising a fuel cell. This known shutting down procedure is activated on reception of a stop signal and comprises an initial stage, during which the supply of oxygen is interrupted, a consumption stage, during which a sustained current is drawn from the fuel cell, a neutralization phase, during which the oxygen feed circuit is opened to the atmosphere, and a final state, during which the supply of hydrogen is interrupted. Further care is taken, that the hydrogen pressure is never lower than atmospheric pressure, which is the pressure of the oxygen circuit at the end of the shut-down sequence.

BRIEF SUMMARY

It is accordingly an object of the present invention to provide a method for operating a fuel cell system, wherein repeated execution of start-stop cycles has a reduced effect on the degradation of performance. It is a further object of the invention to provide a fuel cell system with an appropriate start-stop procedure, with a reduced consumption of reactants during shut-down and starting-up.

According to the present invention, a shut-down procedure of a fuel cell system starts with a decrease in supply of anode gas and cathode gas in response to a control system generating a respective shut-down signal. In the present context, anode gas typically comprises a fuel gas, such as pure hydrogen or hydrogen rich gas. The cathode gas typically comprises an oxygen containing gas or pure oxygen. The supply of reactant gases, namely anode and cathode gas is abruptly or constantly reduced, eventually taking into account the stoichiometric relationship of the electrochemical reaction of oxygen and hydrogen. Even though external supply of anode gas and cathode gas may be interrupted, the gases remaining in the anode side circuit and cathode side circuit of the fuel cell system still react and provide electricity and the reaction product, typically water or water vapor.

In this initial shut-down step, the output voltage of the fuel cell as well as the anode gas pressure and the cathode gas pressure and their respective partial pressures are monitored.

As long as the output voltage of a single fuel cell is within a predefined voltage range, in particular between 0.3 V/cell and 0.8 V/cell, the chemical reaction of the anode gas and the cathode gas still continues. During this first shut-down step, the gas pressure of the anode gas and the cathode gas autonomously reduces due to the ongoing electrochemical reaction. Preferably, the anode feed circuit and the cathode feed circuit are operated in a closed-loop mode, wherein the anode gas and the cathode gas emanating from respective outlets of the fuel cell stack as off-gas are fed back to the fuel cell stack by means of a recirculating line.

As soon as the output voltage of the fuel cell drops below a predefined threshold of for instance 0.3 V/cell or even 0.1 V/cell, at least one cell of the fuel cell stack is electrically shunted to avoid a built-up of high cell voltages that may otherwise be generated by remaining reactants in the fuel cell stack. Typically, not only a single fuel cell but a number of fuel cells or even the entire fuel cell stack can be shunted. After shunting of the at least one fuel cell, e.g. by means of a single resistor or by means of a plurality of sufficiently dimensioned resistors, at least the pressure of the anode side of the fuel cell is further reduced to a predefined pressure level. This reduction can be achieved by at least one pump and/or by means of the ongoing electrochemical consumption of the respective reactants.

In this context it is further to be noted, that the entire stack can be shunted in various different ways. Shunting of the stack can for instance be achieved by making use of a single resistor. Alternatively, each single cell of the stack can be shunted separately, by means of an appropriate cell-specific resistor. Even further, also groups of cells can be shunted by a group-specific resistor. For shunting of the entire stack, the number of required resistors and their dimension has to be adjusted to the number of cells, or groups of cells to be shunted When the predefined pressure level has been reached, the pressure reduced anode side is filled and/or flushed with an inert gas, typically nitrogen or argon, having an asphyxiating effect on the chemical reaction. By pressure reduction and subsequently filling or flushing of the fuel cell stack's anode side with an inert gas, the degradation mechanisms can be counteracted. Further, the development of an over-potential on the cathode side which may arise in situations where hydrogen and oxygen or hydrogen and air from a hydrogen-oxygen front meet on the anode side can be effectively reduced.

Further, compared to prior art solutions, pressure reduction of at least the anode side before filling and/or flushing said side with an inert gas provides the advantage, that the inert gas only insignificantly mixes with the anode gas. Furthermore, the anode gas drawn off from the anode side by the use of a pump can be fed to a storage vessel and does not get lost. Moreover, since the anode side can be substantially evacuated, less inert gas has to be provided to entirely fill the anode side with said inert gas. This is because the anode gas does not have to be flushed or purged out of the anode side of the fuel cell stack by the inert gas.

In a preferred embodiment, both, the pressure of anode side and cathode side of the fuel cell system is reduced to the predefined pressure level, before both, anode side and cathode side, are filled or flushed with the inert gas. Filling or Flushing of anode side and cathode side with inert gas can be performed sequentially and/or simultaneously. Generally, it is of advantage, when the difference of the pressures of anode gas and cathode gas is kept below 0.5 bar, preferably below 0.3 bar. Hence, a control-unit of the fuel cell system has to monitor both pressures of for instance oxygen and hydrogen.

Depending on the consumption of the two reactants during the initial stage of shut-down, the pressure difference can be kept within this predefined interval by selectively supplying the required reactant either externally or by making use of recirculation pumps of either anode feed circuit or cathode feed circuit.

According to another preferred embodiment, the partial pressure of anode gas on the anode side and the partial pressure of cathode gas on the cathode side are reduced below 0.02 bar before the anode side and/or cathode side are filled and/or flushed with inert gas.

Furthermore, it is intended, that before a pump-controlled pressure reduction of anode side or cathode side starts, the absolute gas pressure of anode side and/or cathode side is well below ambient pressure. Typically, gas pressure of anode side and/or cathode side may drop in a region of 0.3 bar or even below at a stack temperature of 60° C. The method according to the present invention further intends to reduce the reactants' partial pressure as much as possible during this initial stage of shut-down, before the pressure of anode side and/or cathode side is actively reduced, e.g. by means of pumps.

At the end of the initial or first shut-down stage, which is also to be denoted as "electrochemical mode" and right before the anode side and/or the cathode side are actively reduced in pressure, the pressure inside the stack is mainly governed by water vapor pressure, hence by the product of the electrochemical reaction.

In a further preferred embodiment, pressure level of anode side and/or cathode side is reduced close to the water vapor pressure. The pressure difference between anode side and cathode side is preferably maintained below 0.2 bar, preferably below 0.1 bar during the second stage of shut-down.

According to a further preferred embodiment, during pressure reduction of anode side and cathode side, the oxygen-containing cathode gas is released to the environment and/or the anode gas, preferably hydrogen, is fed to a storage vessel. Hence, the anode gas is not simply released and thus wasted but stored in an appropriate way, so that it can be used in a subsequent electricity-generating operation mode.

According to another embodiment, the cathode side of the fuel cell system will be at least temporarily opened to ambient atmosphere for ingress of ambient air, if the total gas pressure of the cathode side drops below ambient pressure. Preferably, the cathode side will be opened to ambient atmosphere, if the total gas pressure of the cathode side is in a range between 0.5 to 0.7 bar. Typically, this ingress of ambient air occurs during the first stage of shut-down, in which hydrogen and oxygen are consumed by the ongoing electrochemical reactions.

Since ambient air predominantly comprises nitrogen, under the ongoing electrochemical reaction, the cathode side autonomously enriches with nitrogen or accumulates nitrogen-enriched air. Further in this embodiment, only the pressure of the anode side is actively reduced prior to a subsequent filling and/or flushing with inert gas. By temporarily opening the cathode side during the initial shut-down stage, nitrogen-enriched air autonomously accumulates at the cathode side.

According to a further preferred embodiment of the invention, the anode side of the fuel cell system is flushed with inert gas from an inert gas storage vessel. In this way, the supply of inert gas on board a vehicle can be provided in a cost effective and elegant way. Having an inert gas storage vessel, its application is by no means restricted to filling and/or flushing of only the anode side. Typically, both circuits, anode side and cathode side can be filled or flushed with inert gas from said vessel.

In a further embodiment, wherein the cathode side during the first stage of shut-down is temporarily opened to ambient atmosphere, nitrogen or nitrogen-enriched gas residual of the reaction of anode gas and cathode gas, is at least partially fed to a storage vessel. Additionally or alternatively, nitrogen or nitrogen-enriched gas generated by the ingress of ambient air to the cathode side can also be used later on to fill or to flush the cathode side with nitrogen or nitrogen-enriched gas. Additionally, filling or flushing of cathode side and/or anode side may be supported by nitrogen or nitrogen-enriched gas provided by a storage vessel. In typical embodiments, the nitrogen rich gas comprises at least 90%, preferably at least 98% of nitrogen.

In a further aspect, the invention further provides a method of operating a fuel cell, in particular to start an electricity-generating operation of a shut-down fuel cell. During a preceding shut-down sequence, anode side and cathode side of the fuel cell system were filled and/or flushed with an inert gas and the fuel cell is electrically shunted, e.g. by a resistor. The method to start the electricity-generating operation of the fuel cell system in a first step comprises drawing off the inert gas from the anode side and the cathode side at least for a predefined time interval, typically in the range of seconds, as for instance around 20 seconds.

Additionally or alternatively, the drawing off procedure is conducted until a predefined pressure level at anode side and/or cathode side has been reached. The inert gas drawn off from anode side and/or cathode side is preferably fed to a storage vessel, thus allowing to re-use the inert gas for a subsequent shut-down procedure. When the predefined time interval has lapsed or when the predefined pressure level, typically in the range of 0.3 to 0.5 bar has been reached, the anode side of the fuel cell system is filled and/or flushed with the anode gas.

Thereafter, the cathode side is filled and/or flushed with cathode gas, typically pure oxygen or oxygen rich gas, such as ambient air. As soon as both, cathode side and anode side are sufficiently filled or flushed with respective anode gas and cathode gas, electric power can be drawn from the fuel cell stack and the electrical shunt of the at least one fuel cell of the fuel cell stack is removed at the same time or after electric current is drawn.

Preferably, during filling and/or flushing of anode side and/or cathode side, the pressure difference between anode side and cathode side is kept in a range below 0.5 bar.

Moreover, according to a further preferred embodiment applicable to both, the shut-down as well as to the starting procedure, recirculation pumps of anode feed circuit and/or cathode feed circuit are used to achieve pressure reduction of anode and/or cathode sides and may further be used to fill and/or to flush the anode side and/or cathode side with inert gas. This way, existing pumps of a fuel cell system can be used for the shut-down as well as for the starting procedure according to the present invention. Hence, for pressure reduction or evacuation and for filling and/or flushing of anode side and cathode side, implementation of additional pumps is generally not required.

According to another independent aspect, the invention provides a fuel cell system comprising an anode feed circuit and a cathode feed circuit for feeding of an anode side of a fuel cell with an anode gas, preferably pure hydrogen or hydrogen enriched gas, and for feeding a cathode side with a cathode gas, preferably oxygen or oxygen-containing gas, such as air. For shutting down and for starting of an electricity-generating operation mode, the fuel cell system comprises an inert gas storage vessel and at least one pump for reducing the pressure of at least the anode side to a predefined pressure level. Further, the system comprises means to fill and/or to flush at least the anode side of the fuel cell system with the inert gas.

In this way, the fuel cell system provides a shut-down procedure, wherein the pressure of anode side and/or cathode side of the fuel cell or the fuel cell stack can be reduced to a pressure far below ambient pressure before an inert gas, preferably nitrogen, is fed into the anode side and/or cathode side.

Furthermore, the fuel cell system is adapted to execute the above-described starting procedure, wherein the at least one pump is adapted to draw off the inert gas from anode side and/or cathode side before anode side is filled or flushed with anode gas and wherein afterwards also the cathode sided is filled or flushed with cathode gas, respectively.

BRIEF DESCRIPTION OF THE DRAWINGS

Other features and advantages of the present invention will appear upon reading the following description, given solely by way of non-limiting examples with reference to the annexed drawings, in which.

DETAILED DESCRIPTION

Figure 1:
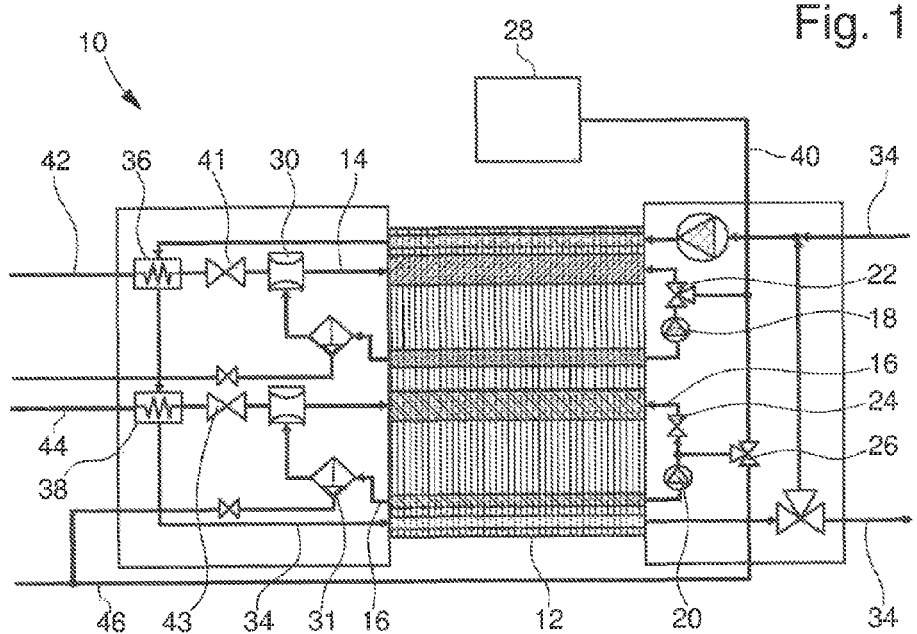
FIG. 1 schematically illustrates the fuel cell system in normal operation mode.

The fuel cell system 10 as illustrated in FIG. 1 comprises a fuel cell stack, typically a proton exchange membrane fuel cell (PEMFC) 12 having an anode feed circuit and a cathode feed circuit. The anode feed circuit is coupled to an anode gas supply 42, and the cathode feed circuit is coupled to a cathode gas supply 44. The system further has a cooling circuit 34, which is thermally coupled to supply lines 42, 44 by means of heat exchanging units 36, 38.

Under normal electricity-generating operating conditions, an anode gas, typically hydrogen, provided by supply line 42 is supplied to the anode side 14. The anode side 14 further has an off-gas recirculating mechanism designed to recirculate an off-gas, which is discharged from the fuel cell 12 and includes anode gas, typically hydrogen, which has not electrochemically been converted. This off-gas is supplied to a gas-liquid separator 29 and reenters the anode side 14 by means of the ejector pump 30. In a similar way, off-gas discharged from the cathode side is supplied to a respective gas-liquid separator 31 and reenters the cathode feed circuit or cathode side 16 by means of the ejector pump 32.

Figure 3:
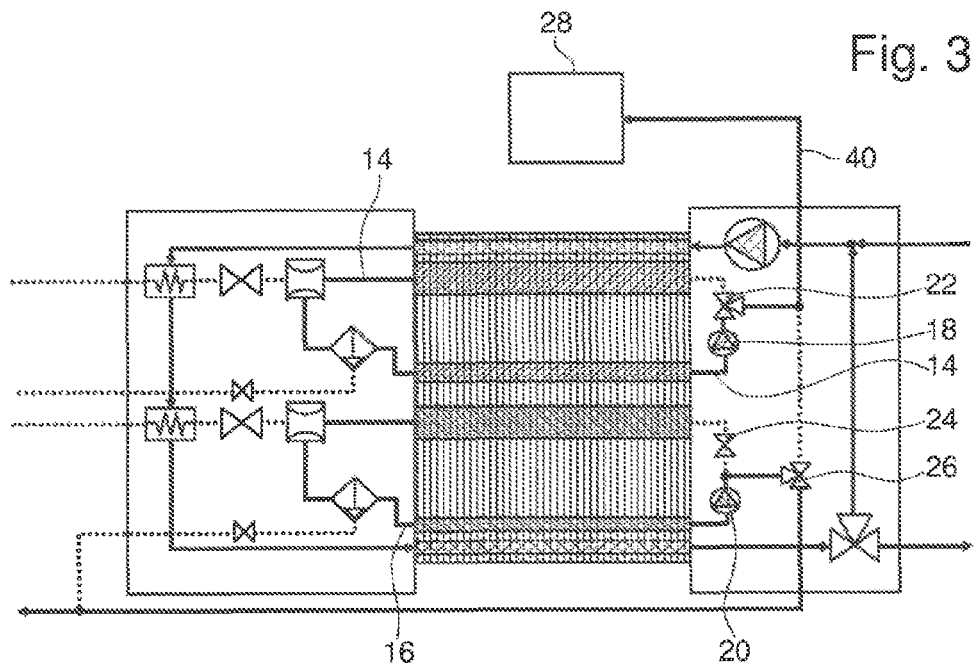
FIG. 3 illustrates pressure reduction of anode side and cathode side.

Each one of either anode and/or cathode side 14, 16 of the fuel cell stack 12 further has a recirculation pump 18, 20, which sustains respective gas circulation. Further, anode side 14 has a valve 22 and cathode side 16 has a valve 24. The anode side 14 of the fuel cell system 10 is further coupled to a supply line 40 by means of the valve 22 and the cathode side 16 is coupled to supply line 40 by means of an additional valve 26. Alternatively, cathode side 16 may also be coupled to a different and additional supply line, not further illustrated here. The supply line 40 is adapted to operate in both directions. It serves to draw off residual reactants from anode side 14 and cathode side 16. For instance, excess hydrogen can be fed to a storage vessel 28 via supply line 40, as depicted in FIG. 3. Additionally, excess cathode gas, like pure oxygen or oxygen rich gas can be drawn off the cathode side 16 and released to the ambient via supply line 46.

Figure 2:
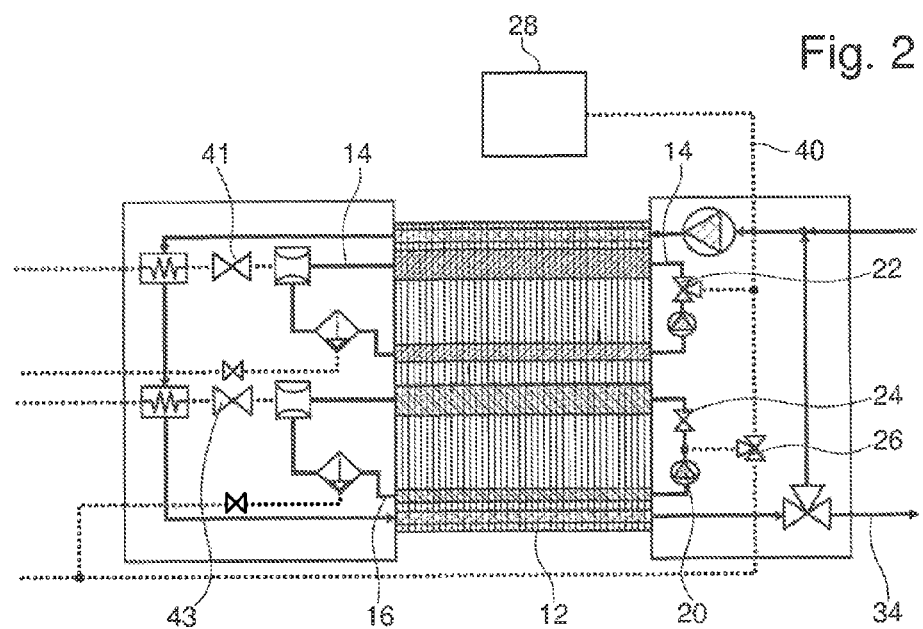
FIG. 2 illustrates the fuel cell system after a cut off from external reactant supply.
Figure 4:
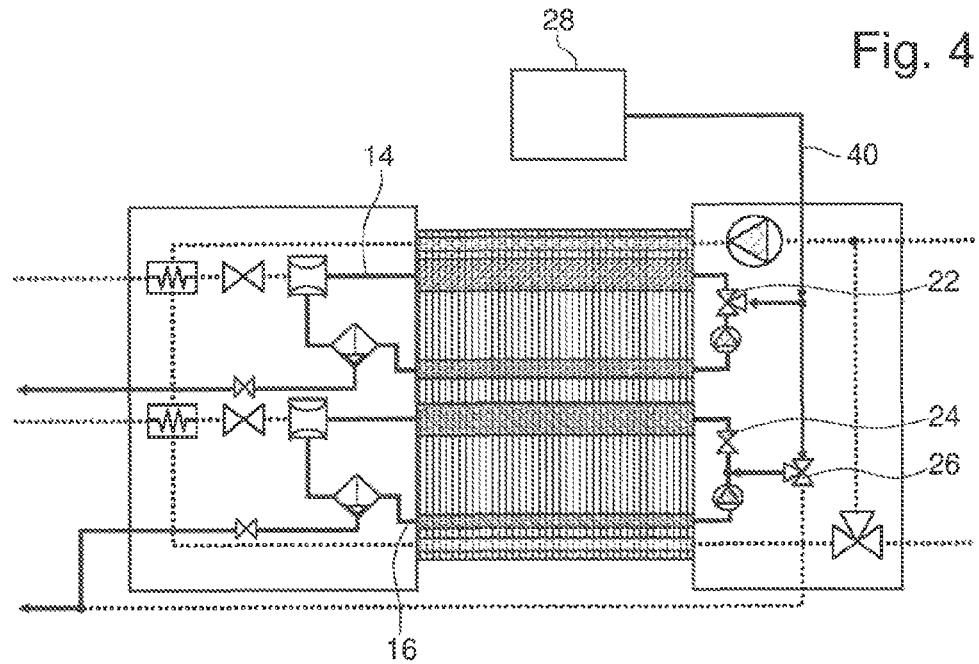
FIG. 4 depicts filling of anode side and cathode side with inert gas.

In the sequence of FIGS. 2 through 4, a shut-down procedure according to the present invention is exemplary illustrated. In a first step, as indicated in FIG. 2, the supply of reactants is decreased or even totally interrupted by closing respective valves 41, 43. In this initial stage of shut-down, the chemical reaction inside the fuel cell stack 12 still continues. Since the external supply of reactants is throttled or even stopped, partial pressures of hydrogen and oxygen constantly decrease as long as a chemical reaction continues. During this initial stage of shut-down, the output voltage of the fuel cell as well as the gas pressures on anode side and cathode side are monitored.

As long as the cell voltages remain in a safe and secure predefined voltage range, which is preferably between 0.1 and 0.8 volt/cell and wherein no anode gas or cathode gas starvation occurs, electrical power can be still drawn off from the system. As soon as the fuel cell leaves this predefined voltage range, hence if for instance the output voltage per cell drops below 0.3 volt or even below 0.1 volt, the electric load on the stack 12 will be reduced correspondingly. If the output voltage cannot be kept in said predefined range, the electric load will be closed down finally.

Under typical practical conditions, the gas pressure at anode side 14 and cathode side 16 is well below ambient pressure. The pressure might be in a range of e.g. 0.3 bar at 60° C. stack temperature. Further, the absolute gas pressure is typically mainly based on the water vapor pressure. The partial pressure of the reactants, hydrogen and oxygen might be lower than 0.1 bar. After the electrical load is closed down, a single cell, several selected cells or the entire fuel cell stack 12 are electrically shunted by means of a resistor. The resistor typically has a resistivity of 5 ohm per cell. E.g., for shunting of a stack of 200 cells, the resistor may comprise 1 k$\Omega$. By means of electrically shunting single fuel cells or the entire fuel cell stack 12, a built-up of over-voltage due to a chemical reaction of remaining reactants in the stack 12 can be prevented.

After shunting of the selected fuel cell stack, the gas pressure of at least the anode side 14 is reduced, typically by making use of the recirculation pump 18. In FIG. 3, excess hydrogen is supplied to a hydrogen storage vessel 28. Optionally, excess oxygen contained in the cathode side 16 is drawn off to the atmosphere by means of the recirculation pump 20, valve 26 and supply line 46. This evacuation of anode side 14 and cathode side 16 by means of recirculation pumps 18, 20 may reduce the reactant's partial pressure in a range below 100 mbar. For instance, partial pressures below 0.02 bar can be reached and are favorable. Hence, the partial pressure of the reactants may become almost negligible. Furthermore, the not particularly illustrated control-unit controls the pressure reduction of anode side 14 and cathode side 16 in such a way, that a pressure difference between anode and cathode is can be maintained below 0.1 bar.

If a predefined pressure level has been reached, anode side 14 and cathode side 16 will be filled and/or flushed with an inert gas provided by a storage vessel 28 as illustrated in FIG. 4. Since anode side 14 and cathode side 16 comprise a pressure level well below ambient pressure, consumption of inert gas can be reduced compared to prior art solutions, where the incoming inert gas has to a expel residual reactants.

Figure 5:
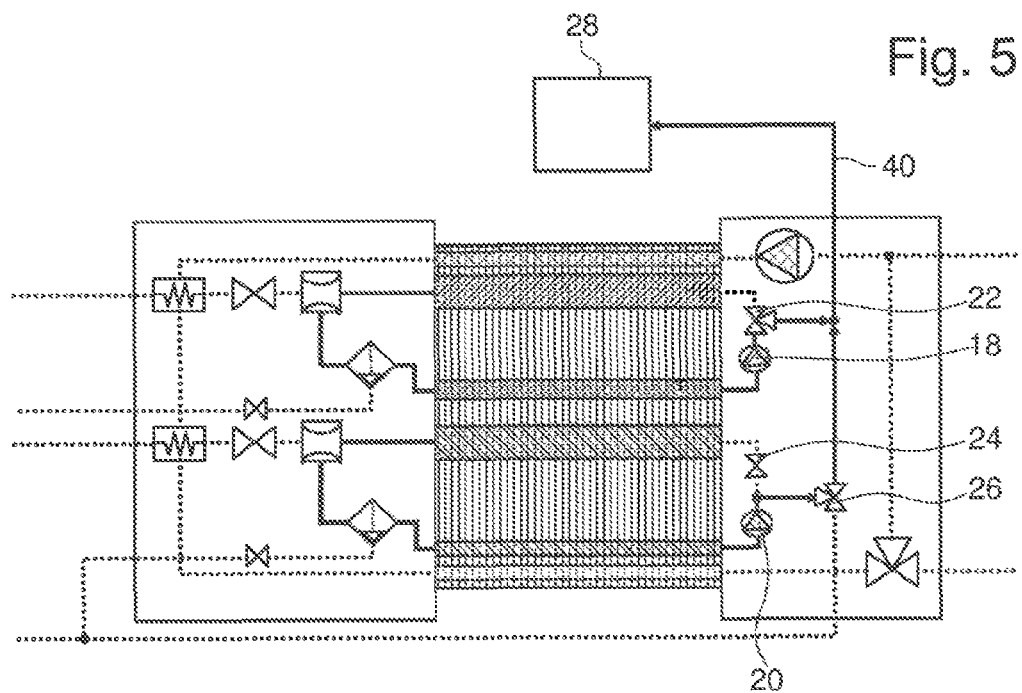
FIG. 5 depicts drawing off of inert gas, FIG. 6 schematically shows filling of the anode side with hydrogen.
Figure 6:
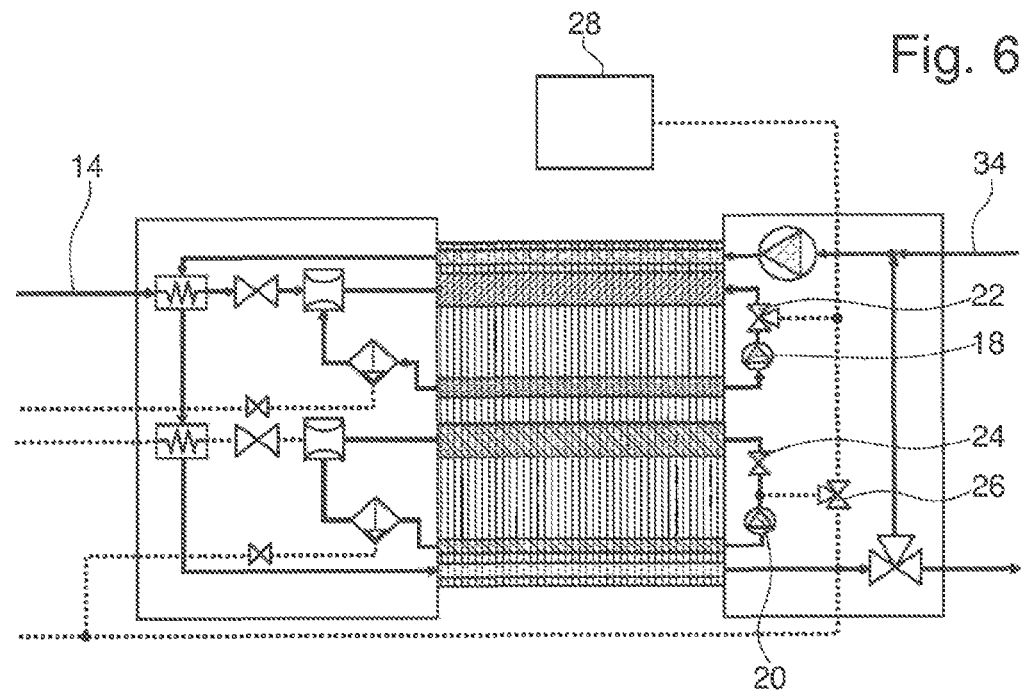
Figure 7:
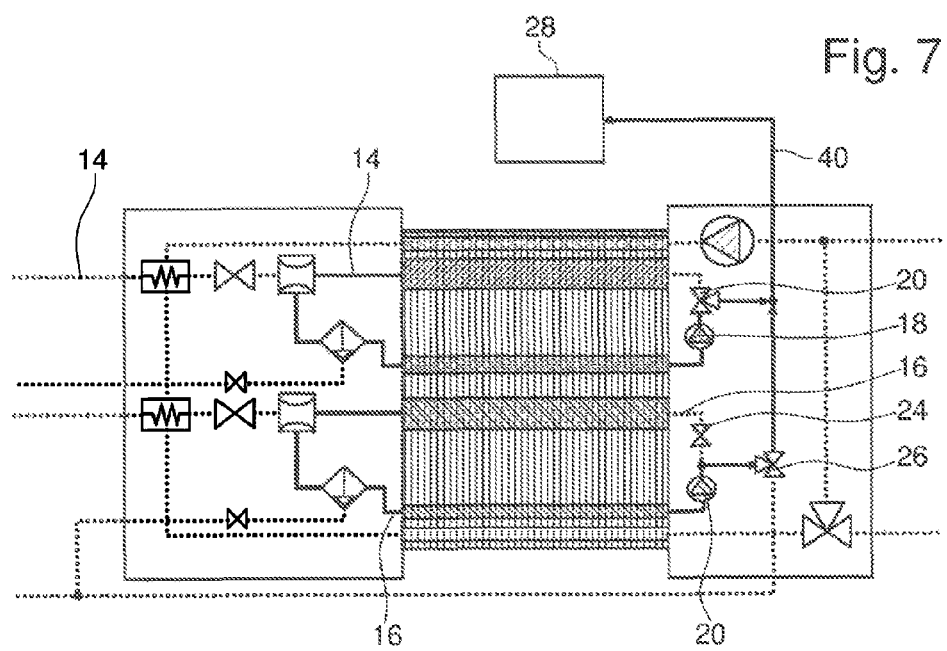
FIG. 7 depicts filling of cathode side with oxygen or cathode gas.

In FIG. 5, a first stage of restarting the fuel cell system 10 is illustrated. In this stage, the recirculation pumps 18, 20 are used to draw off inert gas from anode side 14 and cathode side 16. The inert gas, preferably nitrogen, is then supplied to a storage vessel 28 via the feed line 40. After a sufficient pressure reduction or even evacuation of anode side 14, said anode side 14 is filled and/or flushed with anode gas, e.g. hydrogen, as illustrated in FIG. 6. Thereafter, as illustrated in FIG. 7, also the cathode side 16 is filled and/or flushed with the cathode gas comprising either pure oxygen, oxygen rich gas or air. As soon as both, anode side 14 and cathode side 16 are sufficiently filled with reactants, the electrical load can be applied to the fuel cell stack 12, and the electrical shunt is removed.

During a fuel cell system restart, the pressure reduction of anode side 14 and cathode side 16 is executed during a predefined time interval, which is typically in the range of a few seconds, e.g. between 5 to 30 seconds, preferably around 20 seconds. Additionally or alternatively, the drawing off of inert gas is conducted until a predefined pressure level, e.g. between 0.3 to 0.5 bar is reached. If any of these or both conditions are met, the recirculation pumps, 18, 20 will turn to recirculation mode, by means of accordingly switching respective valves 22, 24, 26. During filling or flushing of anode side 14 and cathode side 16 with respective anode gas or cathode gas, the control-unit is adapted to control the increasing pressure so that the difference between pressure at anode side 14 and cathode side 16 does not exceed 0.5 bar.

Figure 8:
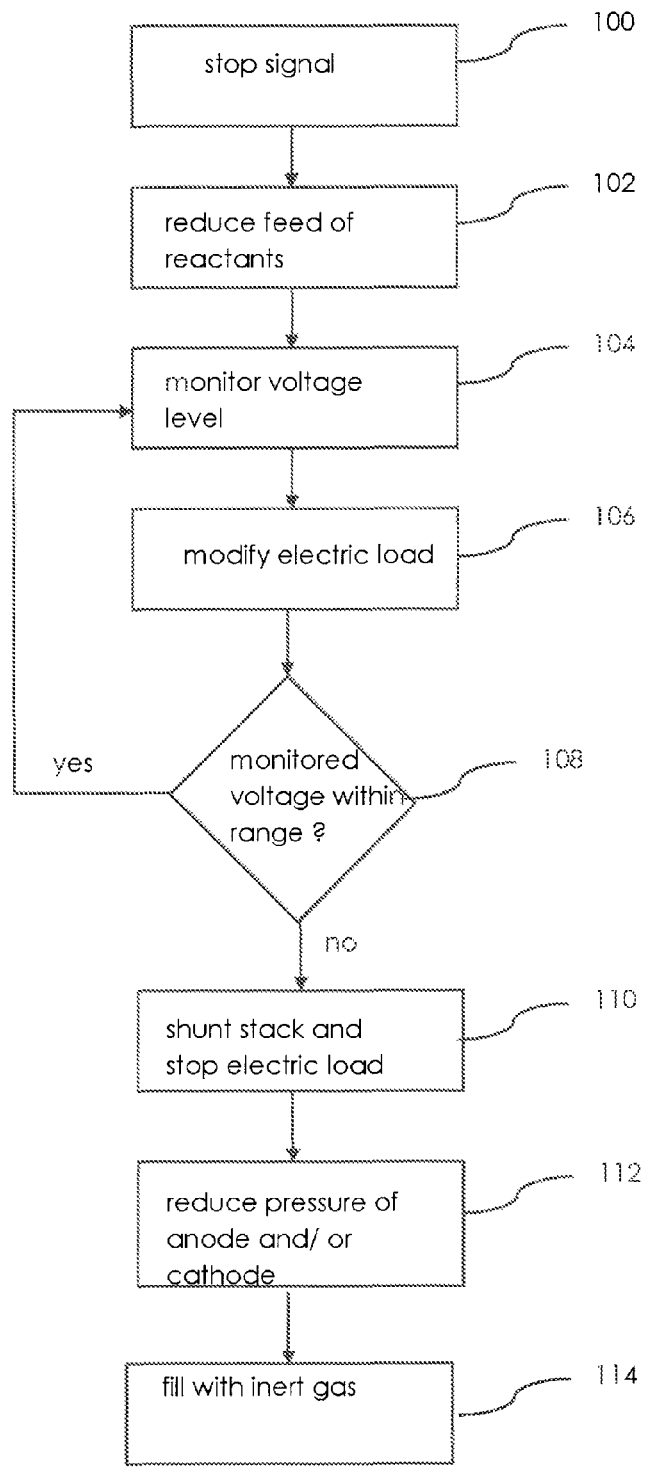
FIG. 8 illustrates a flowchart for shutting down the fuel cell system.

FIG. 8 in a flowchart diagram illustrates the shut-down procedure as illustrated in the sequence of FIGS. 2 to 4. In a first step 100, a generated stop signal indicative of shutting down electricity-generating operation mode of the fuel cell system 10 leads to a reduction or even interruption of external gas supply in step 102. The system is then in its initial stage of shut-down, during which in a first successive step 104 the voltage level of the fuel cell stack 12 is monitored. Due to these modifications, the voltage and the electric load become subject to modification instep 106. As long as in successive step 108 the monitored voltage and hence the corresponding electric load is within a predefined range of 0.1 V/cell to 0.8 V/cell, preferably between 0.3 to 0.8 V/cell, the loop of steps 104,106 and 108 continues. As soon as in step 108 a voltage drop below a predefined threshold is monitored, the fuel cell stack 12 will be subject to shunting by means of an adequate resistor in a successive step 110 and the electric load will be stopped.

Thereafter, in step 112, pressure of both, anode side 14 and cathode side 16 is reduced, preferably by means of respective recirculation pumps 18, 20, before in a final step 114, anode side 14 and cathode side 16 are filled or flushed with an inert gas that may be provided by an inert gas storage vessel.

Figure 9:
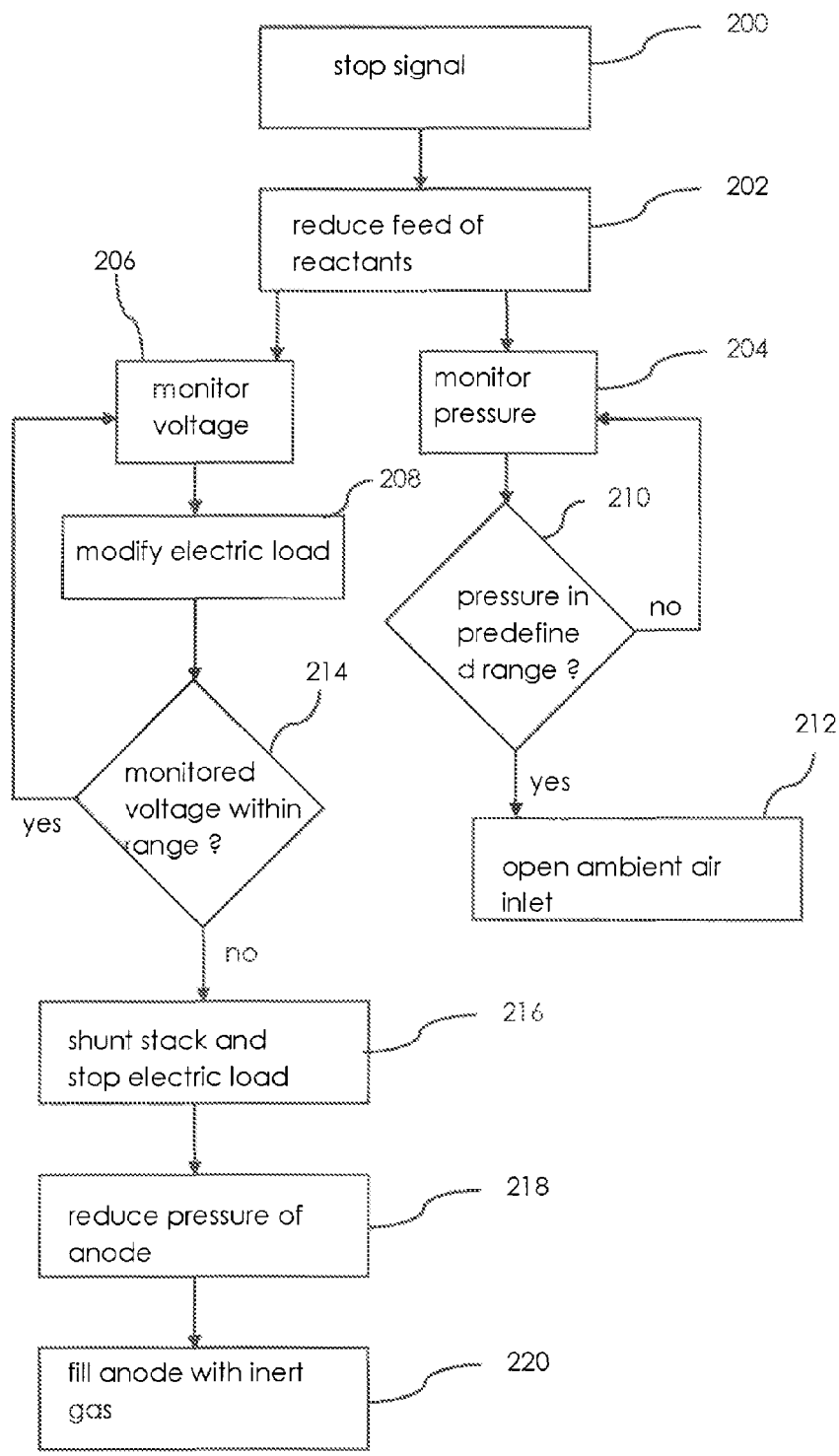
FIG. 9 illustrates a flowchart of an alternative shutting-down procedure and FIG. 10 depicts a flowchart for restarting the fuel cell system.

The flowchart according to FIG. 9 is indicative of an alternative shut-down procedure. Here, the sequence of steps 200, 202, 206, 208, 214, 216, 218 and 220 directly corresponds to the procedure as illustrated in FIG. 8 with the exception, that only the pressure of anode side 14 is actively reduced, e.g. by making use of pumps prior to filling or flushing with inert gas in steps 218 and 220. During the first stage of shut-down, before pressure reduction of anode side starts 14, also the pressure level of anode side 14 and cathode side 16 is monitored in step 204. As soon as the monitored pressure in step 210 enters a predefined interval, of e.g. between 0.5 and 0.7 bar absolute, the cathode side 16 is at least temporarily opened to the ambient atmosphere for ingress of ambient air in step 212. Since the electrochemical reaction inside the stack 12 continues, the partial pressure of cathode gas at the cathode side 16 further decreases with the effect of an increasing nitrogen contribution. In this way, by temporarily opening cathode side 16 to ambient air, said side becomes substantially filled with nitrogen or nitrogen-enriched gas without a preceding pressure reduction or evacuation.

In a further variation, it is also conceivable, that nitrogen obtained at the cathode side 16 due to the ongoing chemical reaction is drawn off and fed to a nitrogen storage vessel 28, providing a reservoir for nitrogen to be fed to the anode side 14 during the final stage of inert gas filling or inert gas flushing. Hence, by ingress of ambient air to the cathode side 16 during said first stage of fuel cell shut-down, nitrogen or nitrogen-enriched gas can be produced for the purpose of filling or flushing both, anode side 14 and cathode side 16 with said inert gas.

Figure 10:
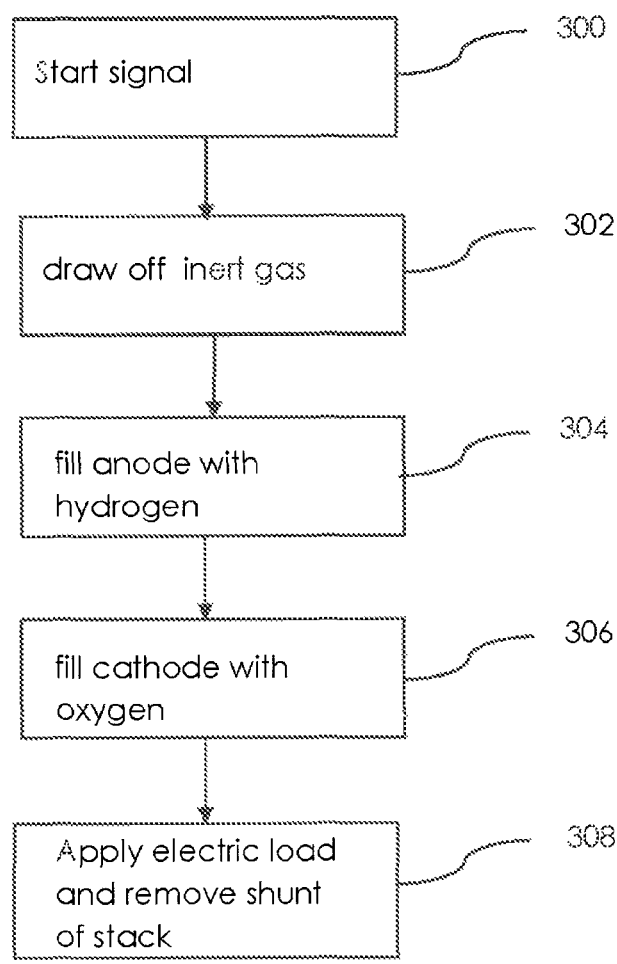

FIG. 10 finally illustrates a restarting procedure of the fuel cell system 10 in a simplified flowchart. Here, in a first step 300, a generated start signal indicative of starting up the electricity-generating operation mode of the fuel cell system 10 leads to a step 302, wherein inert gas present at anode side 14 and cathode side 16 is drawn off, typically by means of recirculation pumps 18, 20, as illustrated in FIG. 5. When a predefined pressure level has been reached, in a successive step 304, the anode side 14 is filled or flushed with anode gas. Thereafter, in step 306, also cathode side 16 is filled or flushed with cathode gas, respectively. Finally, in step 308, an electric load will be applied to the fuel cell system 10 and the shunt of the fuel cell stack 12 is removed.

LIST OF REFERENCE NUMERALS 10 fuel cell system
12 fuel cell stack
14 anode side
16 cathode side
18 recirculation pump
20 recirculation pump
22 valve
24 valve
26 valve
28 storage vessel/inert gas supply
29 gas-liquid separator
30 ejector pump
31 gas-liquid separator
32 ejector pump
34 cooling circuit
36 heat exchanger
38 heat exchanger
40 supply line
41 valve
42 supply line
43 valve
44 supply line
46 supply line

The invention claimed is:

1. A method of operating a fuel cell system connected to a variable load, said fuel cell system including an anode feed circuit and a cathode feed circuit for feeding of an anode side with an anode gas and for feeding a cathode side with a cathode gas, said method being adapted for shutting down an electricity generating chemical reaction of the fuel cell system, said method comprising:

decreasing the supply of anode gas and cathode gas in response to a shut-down signal so that the electricity generating chemical reaction reduces the anode gas pressure and the cathode gas pressure to well below ambient pressure;
monitoring the anode gas pressure and the cathode gas pressure;
monitoring an output voltage of at least one cell of a fuel cell stack;
after the decreasing the supply of anode and cathode gas in response to the shut-down signal, reducing the load in response to the output voltage falling below a predetermined range so that the output voltage returns to the predefined voltage range;
after the reducing the load, further reducing the load in response to the output voltage falling below the predetermined range;
electrically shunting the at least one cell of the fuel cell stack in response to the output voltage reaching a predefined voltage level;
further reducing the pressure of at least the anode side to a predefined pressure level; and
filling and/or flushing of at least the anode side with an inert gas.

2. The method according to claim 1, wherein the step of further reducing the pressure of at least the anode side uses a recirculation pump.

3. The method according to claim 2, wherein the pressure of the anode side and the cathode side of the fuel cell system is reduced to 0.3 bar absolute before using the recirculation pump to further reduce the pressure of at least the anode side.

4. The method according to claim 1, wherein the difference of the pressure of the anode gas and the pressure of the cathode gas is kept below 0.5 bar.

5. The method according to claim 1, wherein the pressures of the anode gas and cathode gas are reduced below 0.02 bar before the anode side and/or cathode side are filled and/or flushed with the inert gas.

6. The method according to claim 1, wherein during reduction of pressure of anode side and cathode side, the cathode gas is released to the environment and/or the anode gas is fed to a storage vessel.

7. The method according to claim 1, wherein, when the total pressure in the cathode side is in a range between 0.5 to 0.7 bar, the cathode side is temporarily opened to the ambient atmosphere for ingress of ambient air.

8. The method according to claim 1, wherein nitrogen or nitrogen-rich gas is used as inert gas.

9. The method according to claim 7, wherein after reduction of pressure of only the anode side, said anode side is filled and/or flushed with inert gas from an inert gas storage vessel.

10. The method according to claim 8, wherein after reduction of pressure of only the anode side, said anode side is filled and/or flushed with inert gas from an inert gas storage vessel.

11. The method according to claim 7, wherein nitrogen or nitrogen enriched gas residual of the reaction of the anode gas and cathode gas, is at least partially fed to a storage vessel.

12. The method according to claim 8, wherein nitrogen or nitrogen enriched gas residual of the reaction of the anode gas and cathode gas, is at least partially fed to a storage vessel.

13. The method according to claim 9, wherein nitrogen or nitrogen enriched gas residual of the reaction of the anode gas and cathode gas, is at least partially fed to a storage vessel.

14. The method according to claim 10, wherein nitrogen or nitrogen enriched gas residual of the reaction of the anode gas and cathode gas, is at least partially fed to a storage vessel.

15. The method according to claim 7, wherein the anode side is filled and/or flushed with nitrogen or nitrogen enriched gas from a storage vessel and/or from the cathode side.

16. A method of operating a fuel cell system including an anode feed circuit and a cathode feed circuit for feeding an anode side with an anode gas and for feeding a cathode side with a cathode gas, said method comprising:
- shutting down an electricity generating chemical reaction of the fuel cell system as claimed in claim 1; and
- after the shutting down, starting an electricity generating operation of the fuel cell system, said starting comprising:
  - drawing off the inert gas from the anode side and the cathode side for a predefined time interval or until a predefined pressure level has been reached;
  - filling and/or flushing of the anode side with the anode gas and thereafter;
  - filling and/or flushing of the cathode side with the cathode gas; and
  - removing of the electrical shunt,
  - wherein recirculation pumps of the anode side and/or cathode side are used to reduce pressure of anode and/or cathode sides and/or are used to fill and/or to flush the anode side and/or the cathode side with inert gas.

17. The method according to claim 16, wherein the pressure difference between the anode side and the cathode side is maintained below 0.5 bar.

18. The method according to claim 16, wherein the inert gas is fed to an inert gas storage vessel.

19. The method according to claim 17, wherein the inert gas is fed to an inert gas storage vessel.

20. A fuel cell system, comprising:
- an anode feed circuit;
- a cathode feed circuit for feeding of an anode side with an anode gas and for feeding a cathode side with a cathode gas,
- wherein, for shutting down and for starting up of an electricity-generating operation, the fuel cell system further includes
  - an inert gas storage vessel, and
  - at least one recirculation pump to reduce the pressure of at least the anode side to a predefined pressure level, and to fill and/or to flush at least the anode side with the inert gas,
- wherein the fuel cell system is configured to
  - decrease the supply of anode gas and cathode gas in response to a shut-down signal so that the electricity generating chemical reaction reduces the anode gas pressure and the cathode gas pressure to well below ambient pressure;
  - monitor the anode gas pressure and the cathode gas pressure;
  - monitor an output voltage of at least one cell of a fuel cell stack;
  - after decreasing the supply of anode and cathode gas in response to the shut-down signal, reduce the load in response to the output voltage falling below a predetermined range so that the output voltage returns to the predefined voltage range;
  - after reducing the load, further reduce the load in response to the output voltage falling below the predetermined range;
  - electrically shunt the at least one cell of the fuel cell stack in response to the output voltage reaching a predefined voltage level;
  - further reduce the pressure of at least the anode side to a predefined pressure level; and
  - fill and/or flush at least the anode side with an inert gas.

21. The method according to claim 1, wherein the reducing the load includes reducing the load a plurality of times so that the output voltage remains in a predefined voltage range until the load is finally disconnected.

22. The method according to claim 1, wherein the predefined voltage range is between 0.3 V/cell and 0.8 V/cell and the predefined voltage level is 0.3 V/cell.

23. The method according to claim 1, wherein the electrically shunting the at least one cell of the fuel cell stack includes electrically shunting the at least one cell via a cell-specific resistor.

24. The fuel cell system according to claim 20,
- wherein the fuel cell system is configured to
  - draw off the inert gas from the anode side and the cathode side for a predefined time interval or until a predefined pressure level has been reached;
  - fill and/or flush the anode side with the anode gas and thereafter;
  - fill and/or flush the cathode side with the cathode gas; and
  - remove the electrical shunt,
  - wherein recirculation pumps of the anode side and/or cathode side are used to reduce pressure of anode and/or cathode sides and/or are used to fill and/or to flush the anode side and/or the cathode side with inert gas.

* * * * *